July 10, 1962 F. B. WHALEN 3,043,459
BOAT TRAILER HAVING FRAME TILTING MEANS
Filed Aug. 17, 1959 2 Sheets-Sheet 1
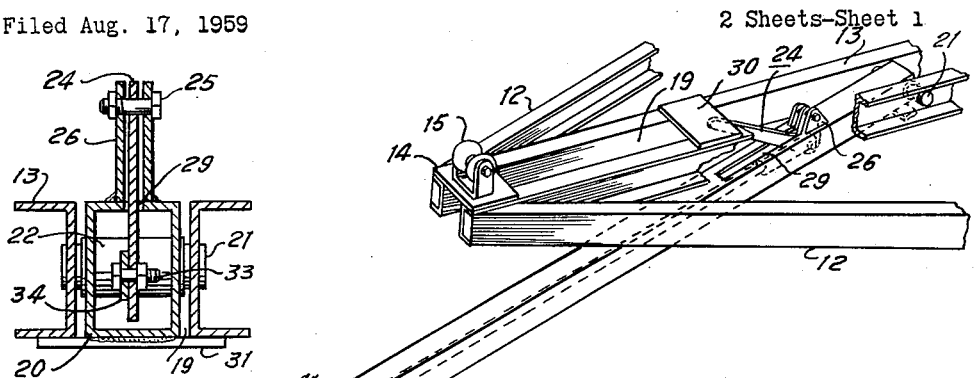
Fig. 5    Fig. 1
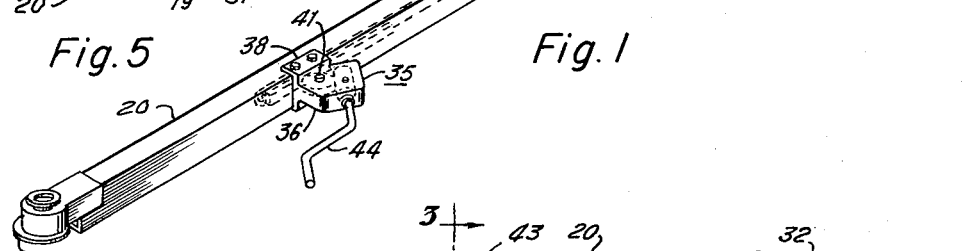
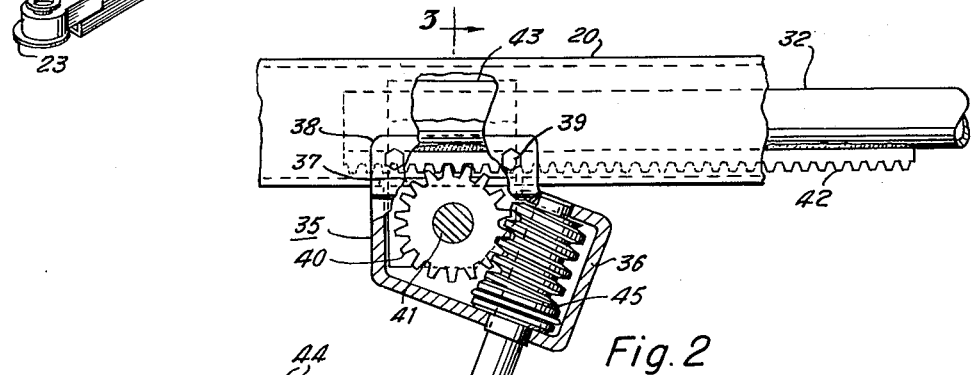
Fig. 2
Fig. 3    Fig. 4
INVENTOR
Frank B. Whalen
BY *Ashley & Ashley*
ATTORNEYS

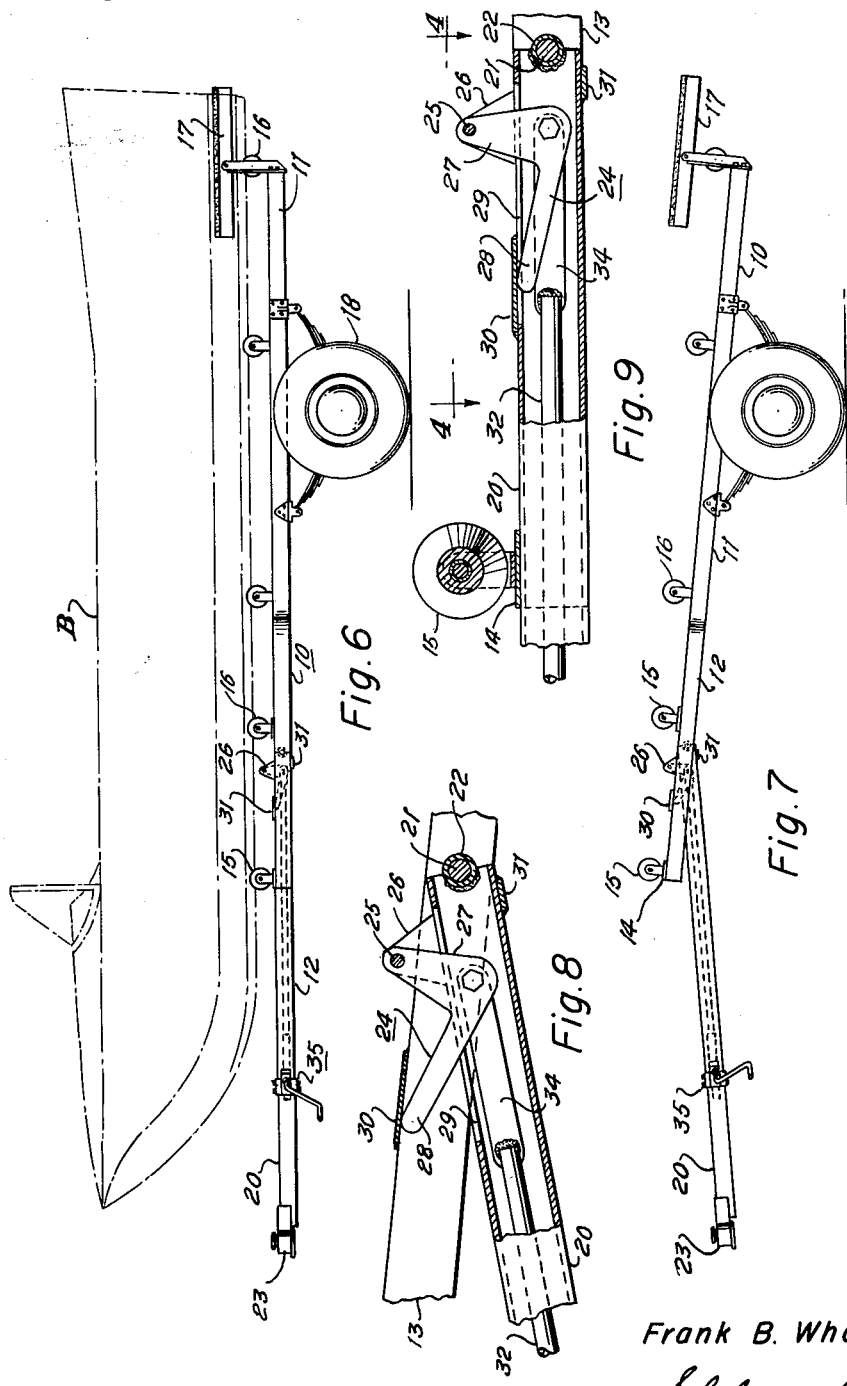

United States Patent Office 3,043,459
Patented July 10, 1962

3,043,459
BOAT TRAILER HAVING FRAME TILTING MEANS
Frank B. Whalen, Dallas, Tex., assignor to Lone Star Boat Company, Grand Prairie, Tex., a corporation of Texas
Filed Aug. 17, 1959, Ser. No. 834,144
7 Claims. (Cl. 214—506)

This invention relates to new and useful improvements in trailers and more particularly to means for tilting the frames or load supporting portions of boat trailers.

One object of the invention is to provide an improved trailer having a load supporting portion pivotally attached to a relatively stationary portion and novel means for pivoting the load supporting portion to tilt the same with respect to the relatively stationary portion.

Another object of the invention is to provide an improved boat trailer having a tiltable frame portion pivotally attached to a tongue portion and a lever carried by one of the portions for engagement with the other portion for imparting relative pivotal movement thereto, together with means for actuating the lever from a remote point.

A further object of the invention is to provide an improved boat trailer, of the character described, wherein the lever is in the form of a bell crank pivotally mounted on the rear portion of the tongue and having pivotal connection with the rear end of an operating member which extends longitudinally of said tongue and which is adapted to be reciprocated by a gear assembly for swinging the bell crank to tilt the frame, the gear assembly being spaced from said frame to facilitate access thereto and actuation thereof.

A particular object of the invention is to provide an improved boat trailer, of the character described, wherein the tongue is tubular and has the operating member disposed therein as well as portions of the bell crank and gear assembly whereby only portions of said crank and assembly are exposed.

A construction designed to carry out the invention will be hereinafter described, together with other features of the invention.

The invention will be more readily understood from a reading of the following specification and by reference to the accompanying drawings, wherein an example of the invention is shown, and wherein:

FIG. 1 is a perspective view, partly in section, of a portion of a trailer constructed in accordance with the invention and having its frame tilted relative to its tongue, FIG. 2 is an enlarged, plan view, partly in section, of the gear rack assembly and its connection to the operating member, FIG. 3 is a transverse, vertical, sectional view, taken on the line 3—3 of FIG. 2, FIG. 4 is a plan view of the bell crank showing its relation to the frame and tongue, taken on the line 4—4 of FIG. 9, FIG. 5 is an enlarged, transverse, vertical, sectional view, taken on the line 5—5 of FIG. 4, FIG. 6 is a side elevational view of the trailer supporting a boat shown in broken lines, FIG. 7 is a side elevational view of the trailer with its frame tilted relative to its tongue, FIG. 8 is an enlarged, side elevational view, partly in section, of the bell crank in elevated or tilting position, and FIG. 9 is a view, similar to FIG. 8 of the bell crank in retracted position.

In the drawings, the numeral 10 designates the frame or boat supporting portion of a trailer for transporting and launching boats and includes a pair of elongated, horizontal, main frame members or channels 11 extending longitudinally of the frame and connected in parallel, spaced relationship by suitable cross bars (not shown). The front end portions of the frame members 11 terminate in converging legs 12 and have a pair of horizontal, parallel, spaced channel members or bars 13 extending longitudinally and disposed therebetween. An overlying bridge or plate 14 connects the front ends of the bars 13 and legs 12 and may have an upstanding roller 15 mounted thereon. As shown in FIGS. 6 and 7, similar rollers 16 are mounted on the frame 10 for engagement by the hull of a boat, such as shown by the broken lines B. If desired, bolsters or cradle elements 17 may be carried by the frame for coacting with the rollers 15 and 16. The trailer includes the usual running gear or ground wheels 18.

The space between the bars 13 provides a longitudinal, medial groove or recess 19 for receiving the rear portion of an elongated tongue or longitudinal member 20 (FIGS. 1, 4 and 5) which is tubular and preferably rectangular in cross-section. The bars 13 have their flanges directed outwardly and the rear extremity of the tongue 20 is pivotally attached to the upright webs of said bars by a horizontal, transverse pivot pin (FIGS. 8 and 9). The tongue underlies the plate 14 and is adapted to engage said plate when the frame and tongue are in alinement as shown in FIG. 6. A tow hitch 23 is mounted on the front end of the tongue 20, which may include other conventional elements, such as a bow bumper, depending support and winch, which have not been shown but which are shown in Patent No. 2,901,138. It is contemplated that a suitable latch, such as shown in the aforesaid patent, will be provided for locking the tongue in alinement with the frame. Since the hitch 23 is connected to a towing vehicle when the trailer is in use, the tongue 20 is relatively stationary and may be referred to as the stationary portion of said trailer.

For tilting the frame 10 relative to the tongue 20, an angular lever or bell crank 24 is pivotally supported by a horizontal, transverse bolt or pin 25 between a pair of upstanding, apertured ears or lugs 26 which project from the upper surface of said tongue adjacent its rear extremity and tubular bearing 22 (FIGS. 1, 4 and 5). The bell crank 24 has an upright, relatively short arm 27 depending from the pin 25 and an elongated, forwardly-extending, lower arm 28. As shown most clearly in FIGS. 8 and 9, an elongated opening or slot 29 extends longitudinally of the upper surface of the tongue to accommodate the bell crank which has its arm 28 disposed within said tongue. For overlying the front end of the slot 28 and engagement by the extremity of the crank arm 28, a cross bar or plate 30 is welded or otherwise secured to the upper flanges of the bars 13 so as to span the recess 19 therebetween. Due to the engagement of the bell crank 24 with the plate 30, the frame is tilted rearwardly when said crank is pivoted clockwise or upwardly (FIGS. 1 and 8). This tilting movement is limited by an underlying cross bar 31 which is secured to the tongue 20 adjacent its rear extremity and which projects laterally from said tongue for engagement with the underside of the bars 13.

An operating rod or elongated member 32, which may be tubular, extends longitudinally within the tongue 20 and has its rear end pivotally attached to the lower end of the bell crank arm 27 by a horizontal, transverse bolt or pin 33. Preferably, the rear end of the rod 32 is flattened or has a flat strap 34 secured thereto for connection with the pin 33. For reciprocating the rod to pivot the bell crank 24, a gear rack assembly 35 is mounted on the front end portion of the tongue in spaced relation to said crank and, preferably, more closely adjacent the hitch 23 (FIGS. 1, 6 and 7). The assembly 35 includes a casing or housing 36 adapted to overlie an opening 37 in one side of the tongue and having angular flanges 38 overlying and attached to the upper and lower surfaces of said tongue by rivets or other fasteners 39 (FIGS. 1–3). A pinion 40 is rotatably supported by an upright shaft 41 extending transversely within the housing 36 and perpendicular to the rod 32. The pinion 40 projects through the opening 37 for meshing with a gear rack 42 which is welded or otherwise secured to the rod and extends longitudinally thereof, the rack being held in engagement with said pinion by a transverse U-shaped bracket or yoke 43 encircling said rod and confined on the shaft 41. A crank 44 has its inner end journaled in the housing and carries a worm 45 in mesh with the pinion for rotating said pinion and reciprocating the rack 42. Due to the forward mounting of the gear rack assembly 35, access thereto is facilitated and the bell crank 24 may be readily actuated.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. In a boat trailer, a frame; a tongue pivotally attached at its inner end to the frame and extending forwardly thereof; an elongated operating shaft extending longitudinally of the tongue; a lever member having a portion pivotally attached to the tongue in spaced relationship forwardly of the pivotal connection between the tongue and the frame, and a portion movable outwardly of the tongue forwardly of said pivotal connection to engage the frame when the lever is rotated about the pivot point therefor; a pivotal connection between the inner end of the operating shaft and a portion of the lever located in spaced relationship from the pivotal connection between the lever and the tongue; and power means carried by the tongue and operatively connected to the outer end of the operating shaft arranged to move the shaft longitudinally of the tongue to thereby rotate the lever into engagement with the frame.

2. The combination called for in claim 1 wherein the lever member is a bell crank lever.

3. The combination called for in claim 1 wherein the tongue is tubular and the operating shaft extends therethrough.

4. The combination called for in claim 1 wherein the power means comprises a gear assembly including a rack gear attached to the shaft, a spur gear rotatably intermeshing with the rack gear, a worm gear rotatably intermeshing with the spur gear, and a handle for rotating the worm gear.

5. The combination called for in claim 1 with the addition of stop means attached to the tongue engageable with the frame to limit the tilting movement of the frame.

6. The combination called for in claim 1 wherein the frame includes a pair of spaced, longitudinal members at its front end with the tongue pivotally disposed between the spaced longitudinal members.

7. The combination called for in claim 6 with the addition of a cross-bar spanning the spaced longitudinal frame members, arranged to be engaged by the outwardly movable portion of the lever, to pivot the frame with relation to the tongue.

References Cited in the file of this patent
UNITED STATES PATENTS

| | | |
|---|---|---|
| 2,057,655 | Anthony et al. | Oct. 20, 1936 |
| 2,316,702 | McDaniel | Apr. 13, 1943 |
| 2,470,360 | Messick | May 17, 1949 |
| 2,493,099 | Adams | Jan. 3, 1950 |
| 2,617,547 | Pridy | Nov. 11, 1952 |
| 2,756,882 | Albertson | July 31, 1956 |
| 2,812,088 | Cadillac et al. | Nov. 5, 1957 |
| 2,823,817 | Holsclaw | Feb. 18, 1958 |
| 2,900,094 | Ferguson | Aug. 18, 1959 |